Nov. 15, 1955  M. K. JUCHHEIM  2,723,564
THERMOMETER
Filed Dec. 29, 1951

INVENTOR
MORITZ E. JUCHEIM

BY  Burgess Dinklage

ATTORNEYS

United States Patent Office 2,723,564
Patented Nov. 15, 1955

2,723,564

THERMOMETER

Moritz Kurt Juchheim, Fulda, Germany, assignor, by mesne assignments, to Bronwill Scientific, Inc., Rochester, N. Y., a corporation of New York Application December 29, 1951, Serial No. 264,112

2 Claims. (Cl. 73—371)

As a rule the vessel of a thermometer containing the liquid measuring and indicating the temperature is designed as a cylindrical vessel closed at the bottom tapering upwardly to the capillary provided with the scale indicating the temperature. Several thermometers, e. g., contact thermometers (such as Beckmann viscosimeter— and calorimeter—thermometers) need, a relatively large vessel as it is necessary to provide there a corresponding large amount of mercury. To warm up this large amount of liquid in the form of a closed coherent mass needs a lot of time. This means that it takes some time until such a thermometer shows the temperature to be measured.

According to the invention this drawback is avoided by providing a vessel having the form of a hollow tube. With reference to the accompanying drawings.

Figure 1:
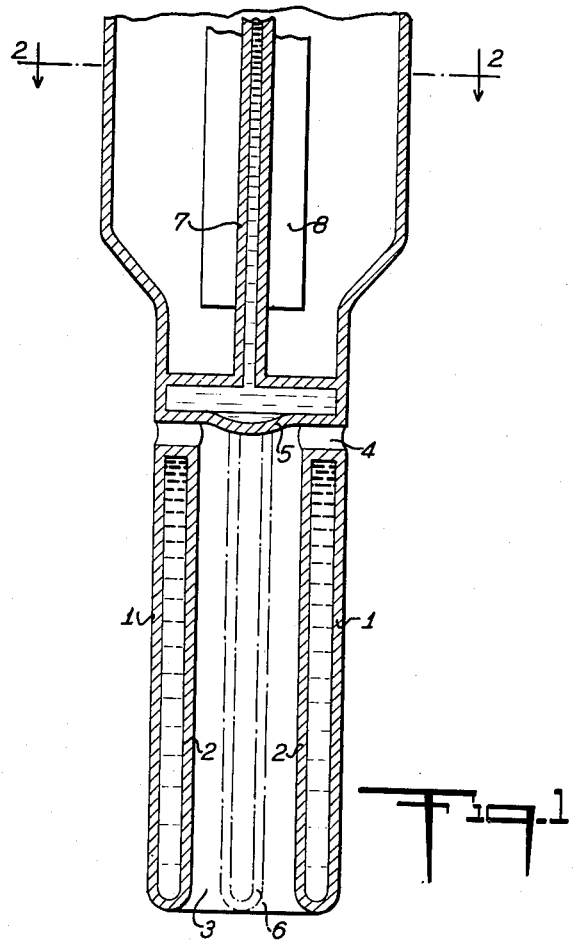
Fig. 1 shows the lower part of a thermometer with the hollow vessel partially in section.
Figure 2:
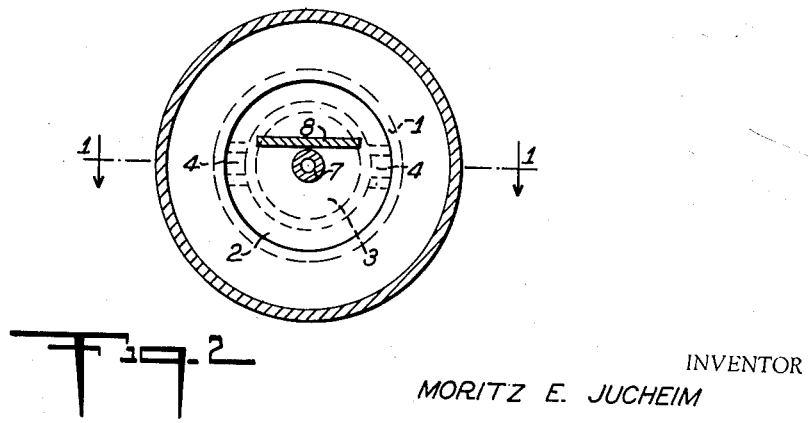
Fig. 2 is a sectional view from above.

The vessel 1 is surrounded from the inside and the outside by the medium to be measured (liquid, air, gas, vapour or the like) and brings the liquid 2 in the thermometer much more quickly up to the same temperature as the surface of the vessel contacted by the medium the temperature of which is to be measured is several times larger than in the case of known thermometers. The hollow space 3 thereby obtained preferably communicates with the outer space by means of one or more cross tubes 4 in such a way, firstly, that the air may escape upwardly and the hollow space 3 may be filled thoroughly with the medium to be measured, e. g., liquid if the thermometer is immersed in a liquid, and, secondly, that the medium to be measured may flow past and around the vessel 1. In order to accomplish this the upper bottom 5 of the hollow space 3 preferably is bulged downwardly in order to avoid the formation of air bubbles. This bulging may advantageously be continued in form of a cylinder 6 in the hollow space 3, this cylinder merging in its upper part into said bulging. Thereby the surface contacted by the medium to be measured becomes still larger. Upwardly the vessel merges into the known capillary 7 which is in front of the scale 8 in cylinder 9. By the construction of the hollow vessel according to the invention with its large contacting surface a quick transmitting of heat is ensured which is of special importance in the case of contact thermometers.

As to the material to be used for building the thermometers, it must be stated that it should be preferably transparent and resistant against the liquid which it contains and of good heat-conductivity. As such materials may be mentioned: glass, quartz-glass and transparent artificial products. If non-transparent material is used (e. g., made from artificial products) for building the thermometer, it is, first of all possible to take this non-transparent material only for the vessel according to the invention. In this case it is of course quite possible to take the temperature from the scale combined with the capillary in the ordinary way. Otherwise, i. e., if non-transparent material is used for the whole thermometer, special means must be provided to take the temperature: As is well known in the art, the displacements of a liquid column may be measured by arranging the liquid column displacements to cause variation of the inductance, resistance or capacitance of an electric circuit, and measuring the effect of such variation on the circuit.

As filling liquids the following may be mentioned: mercury, alcohol, toluene, pentane, petroleum ether.

The best embodiment of the invention is a form where a cylinder is provided merging from the upper bottom of the hollow space as well as a plurality of cross tubes.

The recess defining the liquid vessel as a hollow vessel may be of any shape and of any direction. A plurality of recesses may be provided.

I claim:

1. In a thermometer having a capillary tube, an indicating scale associated with the tube and a liquid containing bulb communicating with the tube, the improvement which comprises the bulb shaped as a double-walled vessel defining an axial hollow space inside the inner wall and communicating with the outside, and an annular enclosure between the two walls communicating with the tube, the hollow space having an open end remote from the tube, at least one transverse bore traversing the enclosure adjacent the tube, and the end surface of he hollow space adjacent the tube being bulged downwardly.

2. In a thermometer having a capillary tube, an indicating scale associated with the tube and a liquid containing bulb communicating with the tube, the improvement which comprises the bulb shaped as a double walled vessel defining an axial hollow space inside the inner wall communicating with the outside and an annular enclosure between the two walls communicating with the tube, the hollow space having an open end remote from the tube, at least one transverse bore traversing the enclosure adjacent the tube, and the end surface of the hollow space adjacent the tube merging into a cylinder extending into the hollow space.

References Cited in the file of this patent

UNITED STATES PATENTS

| | | |
|---|---|---|
| 358,214 | Miles | Feb. 22, 1887 |
| 526,220 | Coleman | Sept. 18, 1894 |
| 970,923 | Hinman | Sept. 20, 1910 |
| 1,102,062 | Liedtke | June 30, 1914 |
| 1,658,953 | Theremin | Feb. 14, 1928 |
| 2,600,396 | Ewen | June 17, 1952 |

FOREIGN PATENTS

| | | |
|---|---|---|
| 8,315 | Germany | Dec. 12, 1879 |